US009620042B2

(12) United States Patent
Lauber et al.

(10) Patent No.: US 9,620,042 B2
(45) Date of Patent: Apr. 11, 2017

(54) MULTIPLE-VIEW DISPLAY SYSTEM WITH USER RECOGNITION AND OPERATION METHOD THEREOF

(71) Applicant: MAGNA ELECTRONICS SOLUTIONS GMBH, Wetzlar (DE)

(72) Inventors: Christoph Lauber, Wetzlar (DE); Gabriel Muresan, Wetzlar (DE)

(73) Assignee: Magna Electronics Solutions GMBH, Wetzlar (DE)

( * ) Notice: Subject to any disclaimer, the term of this patent is extended or adjusted under 35 U.S.C. 154(b) by 89 days.

(21) Appl. No.: 13/745,369

(22) Filed: Jan. 18, 2013

(65) Prior Publication Data

US 2014/0204033 A1    Jul. 24, 2014

(51) Int. Cl.
*G09G 3/00* (2006.01)
*H04N 13/04* (2006.01)
*B60K 35/00* (2006.01)
*B60K 37/06* (2006.01)

(52) U.S. Cl.
CPC .............. *G09G 3/003* (2013.01); *B60K 35/00* (2013.01); *B60K 37/06* (2013.01); *H04N 13/0497* (2013.01); *B60K 2350/104* (2013.01); *B60K 2350/1028* (2013.01); *B60K 2350/901* (2013.01); *B60K 2350/903* (2013.01); *G09G 2354/00* (2013.01); *H04N 2013/0463* (2013.01)

(58) Field of Classification Search
CPC .... H04N 13/0445; B60K 35/00; G06F 3/0488

USPC .......................................... 345/1.1, 173–174
See application file for complete search history.

(56) References Cited

U.S. PATENT DOCUMENTS

| 7,336,037 B2 | 2/2008 | Bruwer |
| 7,443,101 B2 | 10/2008 | Bruwer |
| 7,498,749 B2 | 3/2009 | Bruwer |
| 8,457,838 B1* | 6/2013 | Fear et al. ........................ 701/36 |
| 2003/0220725 A1* | 11/2003 | Harter, Jr. .............. B60K 35/00 701/36 |
| 2007/0262953 A1* | 11/2007 | Zackschewski .............. 345/156 |
| 2007/0265745 A1* | 11/2007 | Styles et al. .................... 701/36 |
| 2011/0084707 A1* | 4/2011 | Nakayama ......... G01C 21/3664 324/649 |
| 2011/0310050 A1 | 12/2011 | Chiang |

FOREIGN PATENT DOCUMENTS

| JP | 6186526 A | 7/1994 |
| JP | 7103778 A | 4/1995 |
| WO | WO2010036217 A1 | 4/2010 |

* cited by examiner

*Primary Examiner* — Amare Mengistu
*Assistant Examiner* — Sarvesh J Nadkarni
(74) *Attorney, Agent, or Firm* — Gardner, Linn, Burkhart & Flory, LLP (57) ABSTRACT

The invention provides a multiple-view display system and a method for operating the same, wherein a seat sensor is incorporated into the system so that it is possible to get the information whether a user is present or not. Therefore, only one sensor installed on one side of the multiple-view touchscreen for detecting a proximity of the user to the multiple-view touchscreen is enough to identify the touchevent is given by which user, and no extra device is required.

19 Claims, 4 Drawing Sheets

MULTIPLE-VIEW DISPLAY SYSTEM WITH USER RECOGNITION AND OPERATION METHOD THEREOF

BACKGROUND OF THE INVENTION

1. Field of the Invention

The present invention relates to a multiple-view display system. In particular, the present invention relates to a multiple-view display system with user recognition ability for different users to provide touchevent.

2. Description of the Related Art

The multiple-view display system could show different video contents on only one screen for multiple recipients, and more and more automotive sectors are employed this technology. For example, when the driver is using the navigation function, the co-driver is watching a movie at the same time. Further, with the development of non-mechanical control technology, such as touch control technology, the user can touch the screen to provide touchevent and control the multiple-view display system to eliminate extra mechanical switching structure and save the cost. However, adapting the touch control technology in the multiple-view display system may encounter touch judgment confusion. The multiple-view display system only has one touchscreen for two users to operate, and the system cannot determine which user made a touchevent to control the multiple-view touchscreen. Therefore, it is necessary for the multiple-view display system to distinguish which user is operating with the multiple-view touchscreen.

There were known approaches to solve the above mentioned problem. For example, Japanese Unexamined Patent Application Publication No. 6-186526 and No. 7-103778 disclose an approach that the buttons or menus for each view around the touchscreen in a manner that are non-overlapping. This approach is achieved by restricting the layout and the design, and large area for emplacement is also required. Another approach is the capacitive coupling solution where a touch object is capacitive connected to a signal source where the mutual capacitance is measured against. However, automotive industry is dedicating to reduce the electromagnetic effect in cars so this approach is not suitable. Camera identification to detect the hand movement of the user interacting with the system is not rewarding because of extra costs for the hardware and high failure rates of detecting under different illumination levels.

US 20110310050A1 and WO 2010/036217 A1 disclose an approach for detecting the user via optical sensors, which is independent from outside factors such as different illumination levels. However, such approach needs multiple sensors arranged around the touchscreen to detect which user is currently to provide a touchevent to the system, and is not cost efficient. Therefore, the approach for avoid touch judgment confusion needs further improvement to lower cost and thereby increase the price competitiveness of multiple-view display system in general.

SUMMARY OF THE INVENTION

One aspect of the invention is to provide a multiple-view display system, comprising: a multiple-view touchscreen adapted to display different video contents simultaneously in accordance with a viewing angle of a first user and a second user and allow the users to provide a touchevent by touching the multiple-view touchscreen; a seat sensor for sensing whether the seat is occupied by the second user; a sensor for detecting a proximity of the first user or the second user to the multiple-view touchscreen; and a controller coupled to the multiple-view touchscreen, the seat sensor and the sensor, and adapted to enable a determination process to identify whether the touchevent is given by the first user or the second user through the proximity information transmitted by the sensor; wherein the determination process is disabled when the seat is not occupied by the second user and the first user is predetermined as a default user in the system; the determination process starts when the seat is occupied by the second user, and the default user converts to the one who is on the opposite side of the sensor.

Another aspect of the invention is to provide a method for operating a multiple-view display system comprising a multiple-view touchscreen, a controller coupled to the multiple-view touchscreen, a seat sensor and a sensor for detecting a proximity of a first user or a second user to the multiple-view touchscreen, comprising:

detecting whether a seat is occupied by the second user via the seat sensor, wherein when the seat is not occupied by the second user, the first user is the default user; when the seat is occupied by the second user, a determination process is initiated and the default user converts to the one who is on the opposite side of the sensor; determining whether the sensor detects a proximity of the user to the multiple-views touchscreen and identifying the touchevent is given by the first user or the second user; converting the touchevent to a command; and responding to the command by the multiple-view display system.

To improve understanding of the different aspects of the disclosure, the techniques employed in the patent invention to achieve the foregoing problems, characteristics and effects thereof are described hereinafter by the way of examples with reference to the accompanying drawings.

DETAILED DESCRIPTION OF THE PREFERRED EMBODIMENTS

In the following detailed description, only certain exemplary embodiments of the present invention are shown and described, by way of illustration. As those skilled in the art would recognize, the described exemplary embodiments may be modified in various way all without departing from the spirit or scope of the present invention.

Accordingly, the drawing and description are to be regarded as illustrative in nature, and not restrictive.

The technical contents of the present invention will become apparent with the detailed description of preferred embodiment.

Figure 1:
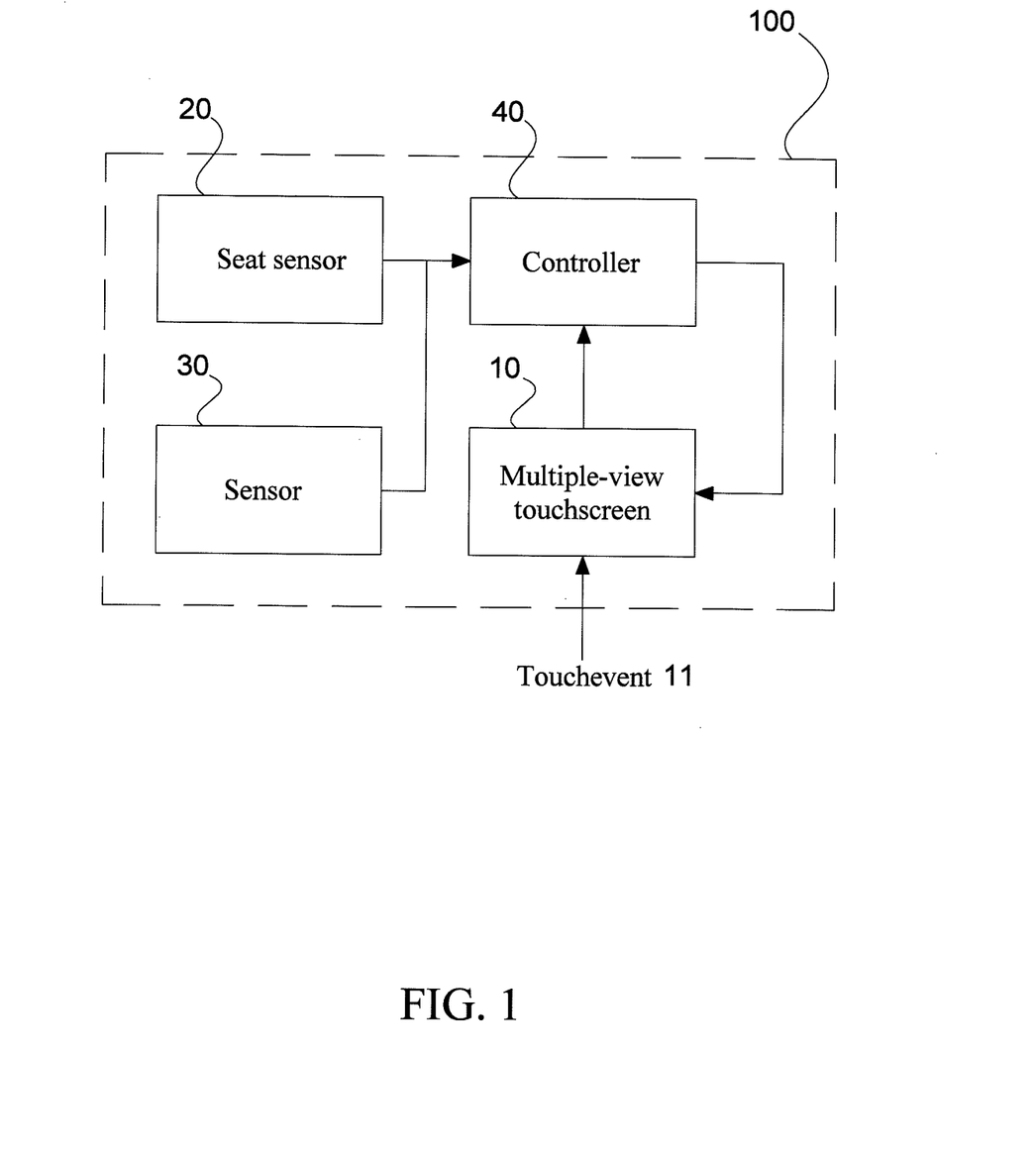
FIG. 1 is a block diagram illustrating an exemplary embodiment of the multiple-view display system of the present invention.

FIG. 1 is a block diagram illustrating an exemplary multiple-view display system 100 of the present invention. In the exemplary embodiment, the multiple-view display system 100 comprises a multiple-view touchscreen 10, a seat sensor 20, a sensor 30 and a controller 40. The multiple-view touchscreen 10 delivers different images to viewers depending on the direction from which the multiple-view touchscreen 10 is being viewed. For example, when the multiple-view display system 100 is used in a car, a first user can see a first video content (such as GPS navigation map) on the multiple-view touchscreen 10 in a first angle of view. Simultaneously, the multiple-view touchscreen 10 may present a second video content (such as a movie or a TV program) to a second user in a second angle of view. It is also possible that the first user and the second user can connect their smart phones separately to the multiple-view display system 100, and mirror the display of their smart phones to the multiple-view touchscreen 10. The multiple-view touchscreen 10 allows the either user to provide a touchevent 11 upon a user touches the multiple-view touchscreen 10. For example, the first user who is viewing the GPS navigation map may provide a touchevent 11 by touching the multiple-view touchscreen 10 at a location that corresponds to the desired menu command (such as inputting the site location or searching on the map.) In addition, the DVD application or TV program may present menu options (such as to pause the movie or to turn down the volume) relevant to the current display being viewed by the second user upon the multiple-view touchscreen 10 is touched. The second user may provide another touchevent 11 by touching the multiple-view touchscreen 10 at a location corresponding to the menu options.

The multiple-view display system 100 is adapted to distinguish whether the touchevent 11 is given by the first user or the second user even if the signal-inputting area for the first user overlap with that of the second user since the two users provide touchevents 11 on the same multiple-view touchscreen 10. To accomplish this, the multiple-view display system 100 includes the seat sensor 20 for sensing a status of a seat occupancy of the second user and for generating an output signal indicative of said status, and a sensor 30 for detecting a proximity of the first user or the second user to the multiple-view touchscreen 10, and a controller 40 coupled to the multiple-view touchscreen 10, the seat sensor 20 and the sensor 30, and adapted to enable a determination process to identify whether the touchevent 11 is given by the first user or the second user.

Figure 2:
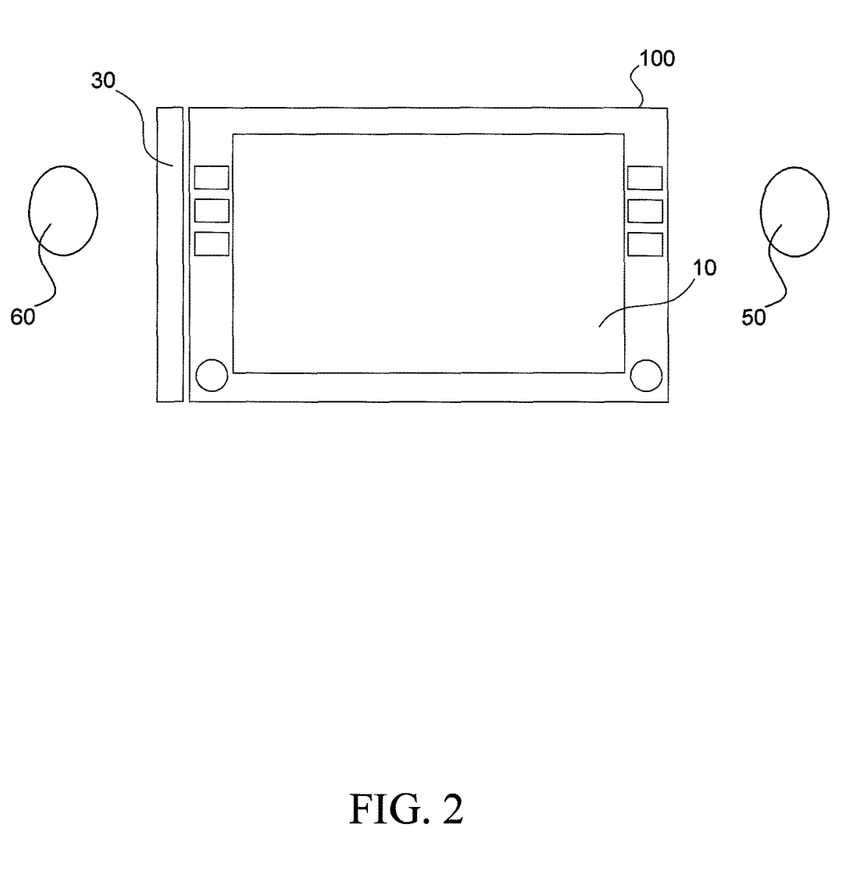
FIG. 2 shows an exemplary embodiment for the multiple-views display system appearance of the present invention.

Referring to FIG. 2, the seat sensor 20 (not shown) is setting on a seat adapted to detect whether the seat is occupied by the second user 50. By incorporating the seat sensor 20 to the multiple-view display system 100, it is possible to get the information if the second user 50 is present or not. While the seat of the second user 50 is empty, then the first user 60 is always in control of the multiple-view touchscreen 10, and a determination process needs not to be started. In this state, the first user 60 is predetermined as a default user in the multiple-view display system 100. Therefore, the failure rate to determination is minimized. The techniques of the seat sensor for detecting a seated position of an occupant are well-known in the art. For example, a technique of providing a seat sensor disposed within a seat cushion for detecting a seated position of an occupant. More specifically, the seat sensor has a sheet-like configuration and is interleaved between a surface layer and a cushion pad of the seat cushion. According to this technique, when an occupant is seated on the seat cushion, a pressing force is applied to the seat sensor by the seating load, so that the seated position can be detected. The occupancy of the second user 50 may also be detected by sensing whether the seatbelt is fastened or not.

If the second user 50 is present, the determination process is started, and the default user converts to the one who is on the opposite side of the sensor 30. In this embodiment, the sensor 30 is set on the left side of the multiple-view touchscreen 10, therefore, the default user converts to the second user 50. In this state, the second user 50 (now is the default user) is always in control of the multiple-view touchscreen 10 except that the non default user (the first user 60) passes the field of the sensor 30 and is so detected as a current user. In other words, if the first user 60 wants to control the multiple-view touchscreen 10, he must pass the field of the sensor 30. If the field of the sensor 30 is not entered, the touchevent 11 is identified as given by the second user 50.

The term "the first user" used herein refers to the one, whose seat occupancy need not to be detected, and is preset to be a default user when the determination process of the system of the present invention does not start. The term "the second user" used herein refers to the one, whose seat occupancy is detected by the seat sensor 20 to enable the determination process of the system of the present invention. The term "default user" used herein can divide to two stages (the determination process is started or not); one refers to the user who is always in control of the multiple-view display system 100 when the determination process is not started; in this stage, the default user is the one who is not detected by the seat sensor 20. The other is that when the determination process is started, the default user is the one who is on the opposite side to the sensor 30 and is always in control of the multiple-view touchscreen 10 except that the non default user passes the filed of the sensor 30 and is so detected as a current user.

If the multiple-view display system 100 of this embodiment (FIG. 2) is adapted to a car, the first user 60 may be a driver and the second user 50 may be a co-driver. The seat sensor 20 is for detecting the seat occupancy of the co-driver. Therefore, if the co-driver is not present, the determination process needs not to be started and the driver, who is not detected by the seat sensor 20, is predetermined as a default user and is always in control of the touchscreen 10. If the co-driver is present, the determination process is started. In this state, the default user converts to the one who is on the opposite side of the sensor 30, namely, the co-driver. Therefore, all touchevents are related to the co-driver. If the driver wants to interact with the touchscreen 10, he must lead his arm to the multiple-view touchscreen 10. By doing this, he is detected by the sensor 30, and the system will determine that the incoming touchevent 11 is related to the driver. This embodiment might be a preferable embodiment because it is guaranteed that in case of a detection error of the sensor 30, the co-driver cannot manipulate the view of the driver.

Figure 3A:
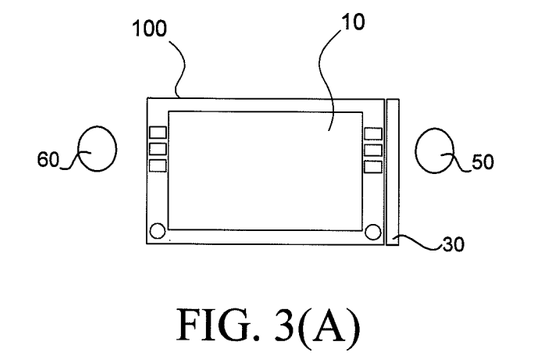
FIGS. 3(A)-3(C) show exemplary embodiments with different arrangement possibilities for placing the sensor of the present invention.
Figure 3B:
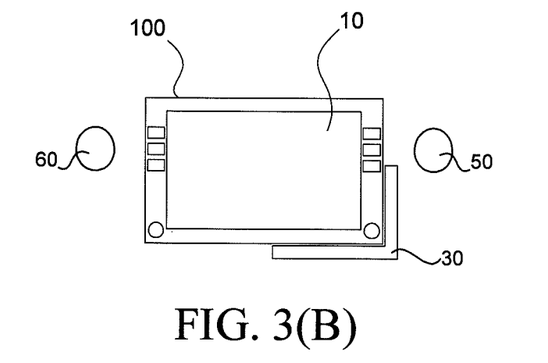
Figure 3C:
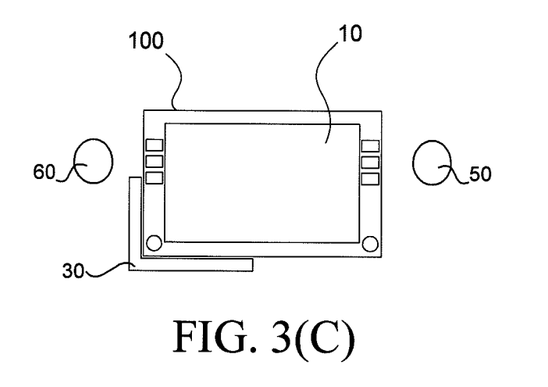

Other embodiments of different arrangements of the sensor 30 are provided in FIGS. 3(A)-3(C). Referring to FIG. 3(A), a seat sensor 20 (not shown) is incorporated to the multiple-view display system 100 for sensing the status of the seat occupancy of the second user 50. The sensor 30 for detecting a proximity of the second user 50 to the multiple-view touchscreen 10 is setting on the right side of the multiple-view touchscreen 10. While the seat of the second user 50 is empty, the determination process is disabled and then the first user 60 is predetermined as a default user and is always in control of the multiple-view touchscreen 10. If the second user 50 is present, the seat occupancy of the second user 50 is detected by the seat sensor 20, the determination process is started, and the default user converts to the one who is on the opposite side of the sensor 30. In this stage of this embodiment, the default user who is on the opposite side of the sensor 30 is the first user 60.

Therefore, the system 100 maintains the default user to be the same person, namely, the first user 60. If the second user 50 wants to control the multiple-view touchscreen 10, he must pass the field of the sensor 30 and is so detected as the current user. If the field of the sensor 30 is not entered, the touchevent 11 is identified as given by the first user 60. Other modifications of the arrangement of the sensor 30 are possible, as shown in FIG. 3(B) and FIG. 3(C). In FIG. 3(B), the sensor 30 is setting at lower right of the multiple-view touchscreen 10, and in FIG. 3(C), the sensor 30 is setting at lower left of the multiple-view touchscreen 10. In such arrangement, the detection accuracy may be enhanced.

The sensor 30 for detecting a proximity of the first user or the second user to the multiple-view touchscreen 10 can be a laser sensor, a variable capacitor, an ultrasonic sensor, an optical sensor or an infrared sensor. Examples of there sensors can be found in U.S. Pat. Nos. 7,498,749, 7,443,101 and 7,336,037. For example, the sensor 30 can be an optical sensor that converts light rays into electronic signals. It has the ability to measure the changes from one or more light beams. This change is most often based around alterations to the intensity of the light. When a phase change occurs, the light sensor acts as a photoelectric trigger, either increasing or decreasing the electrical output, depending on the type of sensor. Another exemplary sensor 30 includes a variable capacitor, the capacitance of which changes in value when a user is proximate thereto. The variable capacitor is connected as one input to a comparator, and a reference voltage is provided as the other input to the comparator.

Those of ordinary skilled in the art will understand that, while the sensor 30 is illustrated above, the use of other types of sensors are within the scope of the present invention. By ways of example, the sensor 30 for detecting a proximity of the first user or the second user to the multiple-view touchscreen 10 may operate based on inductance, infrared signals, optical signals or the like. The choice of a particular sensor type may be made by one of ordinary skilled in the art based on the multiple-view display system 100 design considerations.

In a preferable embodiment, the multiple-view display system 100 is contained in an infotainment system of a vehicle. More precisely, the infotainment system is mounted in the center of a car dashboard. However, the multiple-view display system 100 can also be applied in planes or trains or consumer electronics. The multiple-view touchscreen 10 may be a capacitive or resistive touchscreen, and all touchevents will be detected by the touch screen reader. The multiple-view display system 100 may further comprise a video mixing unit for generate two video signals such as a navigation and a movie corresponded to the first user and the second user.

Figure 4:
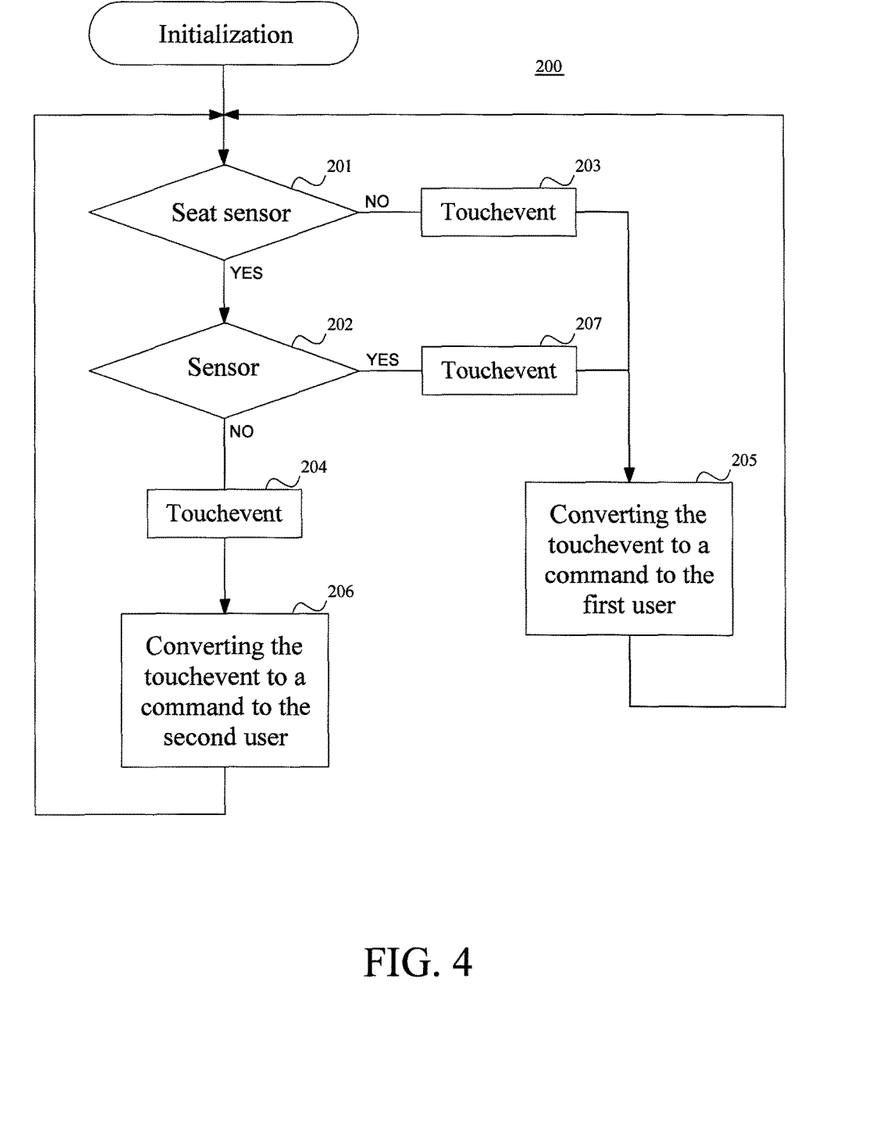
FIG. 4 shows a flow chart illustrating an exemplary embodiment method for operating the multiple-view display system of the present invention.

FIG. 4 shows a flow chart illustrating a method in accordance with the exemplary embodiment corresponding to FIG. 2 of the present invention, namely, the seat sensor is for detecting the seat occupancy of the second user who is at the right side of the multiple-view touchscreen, and the sensor is setting at the left side of the multiple-view touchscreen. The method is generally referred to by the reference number 200. After the initialization of the multiple-view display system 100, at block 201, the seat occupancy of the second user is detected via a seat sensor. If the seat is empty, it means that the second user is not present and the first user is predetermined as a default user, and every touchevent (block 203) is identified as given by the first user, and the next determination process that a sensor sensing a proximity of the user to the multiple-view touchscreen (block 202) is disabled. If the seat sensor detects the second user, then the determination process starts, and the default user converts to the one who is on the opposite side of the sensor, that is the second user (block 202). The sensor installed on the left side of the touchscreen is for detecting a proximity of the first user to the multiple-view touchscreen and transmitting the proximity information to the controller, and the controller can decide whether the touchevent is related to which user. If the first user provides a touchevent to the multiple-view touchscreen (block 207), he must pass the field of the sensor and is so detected as the current user (block 205). If the field of the sensor is not entered, the touchevent (block 204) is identified as given by the second user (block 206). After determining whether the sensor detects proximity of the user to the multiple-view touchscreen, the controller can identify the touchevent is given by which user, and convert the touchevent to a command; and the multiple-view display system may respond to the command.

In conclusion, the invention provides a multiple-view display system and method for operating the multiple-view display system. It is to be understood that in modern vehicles, the seat sensor already exists. By incorporating the seat sensor to the multiple-view display system, it is possible to get the information whether a user is present or not. Therefore, only one sensor installed on one side of the multiple-view touchscreen for detecting a proximity of the user to the multiple-view touchscreen is enough to distinguish the occupants, and no extra device is required, thus decreases the cost.

While the present invention has been described in connection with certain exemplary embodiments, it is to be understood that the invention is not limited to the disclosed embodiment, but, on the contrary, is intended to cover various modifications and equivalent arrangement include within the spirit and scope of the appended claim, and equivalent thereof.

What is claimed is:

1. A multiple-view display system, comprising:
   a controller having a video mixer configured to generate two video signals that correspond to a first user and a second user;
   a multiple-view touchscreen adapted to display different video contents the two video signals simultaneously in accordance with a viewing angle of a respective one of the first user and a-the second user and allow the users to provide a touchevent by touching the multiple-view touchscreen;
   a first smart phone operable to connect to the controller, wherein, when the first smart phone is connected, the multiple-view touch screen is adapted to display a displayed image of the display of the first smart phone at the viewing angle of the first user;
   a second smart phone operable to connect to the controller, wherein, when the second smart phone is connected, the multiple-view touch screen is adapted to display a displayed image of the display of the second smart phone at the viewing angle of the second user;
   a seat sensor for sensing whether a seat is occupied by the second user; a sensor having a sensory field proximate a lateral side and a bottom portion of the touchscreen for detecting a proximity of the first user or the second user at the multiple-view touchscreen;
   a controller coupled to the multiple-view touchscreen, the seat sensor, and the sensor, and adapted to execute a determination process to identify whether the touchevent is given by the first user or the second user responsive to sensing by the sensory field;

wherein the determination process is disabled when the seat is not occupied by the second user, and thereby the first user is a default user in the system; and wherein the determination process is enabled when the seat is sensed by the seat sensor to be occupied by the second user, and thereby the default user is the user on the opposite side of the touchscreen from the sensory field, and wherein an output of the touchscreen responsive to the default user's touchevent is associated with the video content displayed at the viewing angle of the default user, and wherein, when the nondefault user is sensed by the sensory field to be at the touchscreen, the output of the touch screen responsive to the non-default user's touchevent is associated with the video content displayed at the viewing angle of the non-default user.

2. The multiple-view display system of claim 1, wherein the sensor is a laser sensor, a variable capacitor, an ultrasonic sensor, an optical sensor or an infrared sensor.

3. The multiple-view display system of claim 1, wherein the sensor is for detecting the proximity of the second user to the multiple-view touchscreen.

4. The multiple-view display system of claim 1, wherein the multiple-view touchscreen is a capacitive touchscreen.

5. The multiple-view display system of claim 1, wherein the multiple-view touchscreen is a resistive touchscreen.

6. The multiple-view display system of claim 1, wherein the multiple-view display system is setting on a head unit in a front dashboard of a vehicle.

7. The multiple-view display system of claim 6, wherein the head unit is an infotainment system.

8. The multiple-view display system of claim 1, wherein the seat sensor is adapted to detect whether a seatbelt is fastened.

9. A method for operating a multiple-view display system comprising a multiple-view touchscreen, a controller coupled to the multiple-view touchscreen, a seat sensor, and a sensor having a sensory field configured to sense one of a first user and a second user at the multiple-view touchscreen, comprising:
   detecting whether a seat is occupied by the second user via the seat sensor, wherein, when the seat is not occupied by the second user, the first user is the default user;
   wherein, when the seat is occupied by the second user, a determination process is initiated and the other of the first user and the second user that is not sensed by the sensory field is designated as a default user;
   determining which of the first or second user makes a touchevent at the touch screen by determining whether or not the sensory field of the sensor detects the non-default user at the touchscreen;
   converting the touchevent to a command associated with information displayed at a viewing angle of the multiple-view touchscreen of the first or second user that is determined to have made the touchevent;
   wherein a first smart phone operable by the first user is connected to the multiple-view display system, and wherein the multiple-view touch screen is adapted to display a displayed image of the display of the first smart phone at the viewing angle of the first user;
   wherein a second smart phone operable by the second user is connected to the multiple-view display system, and wherein the multiple-view touch screen is adapted to display a displayed image of the display of the second smart phone at the viewing angle of the second user; and
   transmitting the command by the multiple-view display system to the first or second smart phone associated with the first or second user that is determined to have made the touchevent.

10. The method of claim 9, wherein the sensor is a laser sensor, a variable capacitor, an ultrasonic sensor, an optical sensor or an infrared sensor.

11. The method of claim 9, wherein the multiple-view touchscreen is a capacitive touchscreen.

12. The method of claim 9, wherein the multiple-view touchscreen is a resistive touchscreen.

13. A multiple-view display system for a vehicle, comprising:
   a multiple-view touchscreen controllable with a touchevent and adapted to simultaneously display a driver video content to a driver of the vehicle at a driver viewing angle and a passenger video content to a passenger of the vehicle at a passenger viewing angle;
   a first smart phone operable by the driver for the multiple-view touch screen to display a displayed image of the display of the first smart phone at the driver viewing angle;
   a second smart phone operable by the passenger for the multiple-view touch screen to display a displayed image of the display of the second smart phone at the passenger viewing angle;
   a seat sensor for sensing when a passenger seat is occupied by the passenger;
   a sensor having a sensory field for monitoring when one of the driver and the passenger is at the multiple-view touchscreen, the monitored one being a monitored user and the other as a non-monitored user;
   a controller configured to identify whether the touchevent is given by the driver or the passenger based on the seat sensor and the sensor;
   wherein the controller enables a determination process when the passenger seat is sensed by the seat sensor to be occupied by the passenger;
   wherein the determination process identifies the non-monitored user with the touchevent, unless the sensor detects monitored user at the multiple-view touchscreen and then the monitored user is identified with the touchevent;
   wherein an output of the touchscreen is responsive to the touchevent and the output is associated with the video content displayed to the determined monitored user or non-monitored user that is identified with the touchevent;
   wherein the output is transmitted to the first or second smart phone associated with the determined monitored user or non-monitored user that is identified with the touchevent; and
   wherein the determination process is disabled when the seat is not occupied by the passenger, and thereby the driver is identified with the touchevent.

14. The multiple-view display system of claim 13, wherein the driver is the monitored user.

15. The multiple-view display system of claim 13, wherein the passenger is the monitored user.

16. The multiple-view display system of claim 13, wherein the multiple-view touchscreen is at least one of a capacitive touchscreen and a resistive touchscreen at a front dashboard of the vehicle.

17. The multiple-view display system of claim 13, wherein an output of the touchscreen responsive to the touchevent is associated with the driver video content when the driver is determined to have given the touchevent and with the passenger video content when the passenger is determined to have given the touchevent.

18. The multiple-view display system of claim 13, wherein the sensor is an ultrasonic sensor, an optical sensor, or an infrared sensor.

19. The multiple-view display system of claim 13, wherein the driver video content includes a GPS navigation map and the passenger video content includes a movie.

* * * * *

UNITED STATES PATENT AND TRADEMARK OFFICE
CERTIFICATE OF CORRECTION

PATENT NO.        : 9,620,042 B2                             Page 1 of 1
APPLICATION NO.   : 13/745369
DATED             : April 11, 2017
INVENTOR(S)       : Christoph Lauber et al.

It is certified that error appears in the above-identified patent and that said Letters Patent is hereby corrected as shown below:

In the Claims

Column 6
Claim 1, Line 42-43, "display different video contents the" should be --display the--
Claim 1, Line 45, "a-the" should be --the--

Column 7
Claim 1, Line 12, "nondefault" should be --non-default--

Signed and Sealed this
Thirteenth Day of November, 2018

Andrei Iancu
*Director of the United States Patent and Trademark Office*